United States Patent
Smith, III

(10) Patent No.: US 6,626,207 B1
(45) Date of Patent: Sep. 30, 2003

(54) UNDERSEA HYDRAULIC COUPLING WITH INTERLOCKING POPPET VALVE ACTUATORS

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 10/094,392

(22) Filed: Mar. 8, 2002

(51) Int. Cl.[7] .................................................. F16L 37/30
(52) U.S. Cl. ............................... 137/614.03; 137/614.04
(58) Field of Search ........................ 137/614.04, 614.03, 137/614, 614.05; 251/149.1, 149.6, 149.7

(56) References Cited

U.S. PATENT DOCUMENTS

| | | | | |
|---|---|---|---|---|
| 2,397,265 A | * | 3/1946 | Jacobsson et al. | 137/614.04 X |
| 3,435,848 A | * | 4/1969 | Johnston | 137/614.04 |
| 5,099,882 A | * | 3/1992 | Smith, III | 137/614.04 |
| 5,960,829 A | * | 10/1999 | Sigler | 137/614.03 |

* cited by examiner

Primary Examiner—Kevin Lee
(74) Attorney, Agent, or Firm—Wong, Cabello, Lutsch, Rutherford & Brucculeri, LLP

(57) ABSTRACT

Interlocking poppet valve actuators for undersea hydraulic coupling members are disclosed. The actuators extend from the poppet valves of each coupling member, and interlock to resist bending and/or other lateral displacement caused by hydraulic fluid flow and turbulence in the coupling member bores and at the junction between the coupling members.

12 Claims, 2 Drawing Sheets

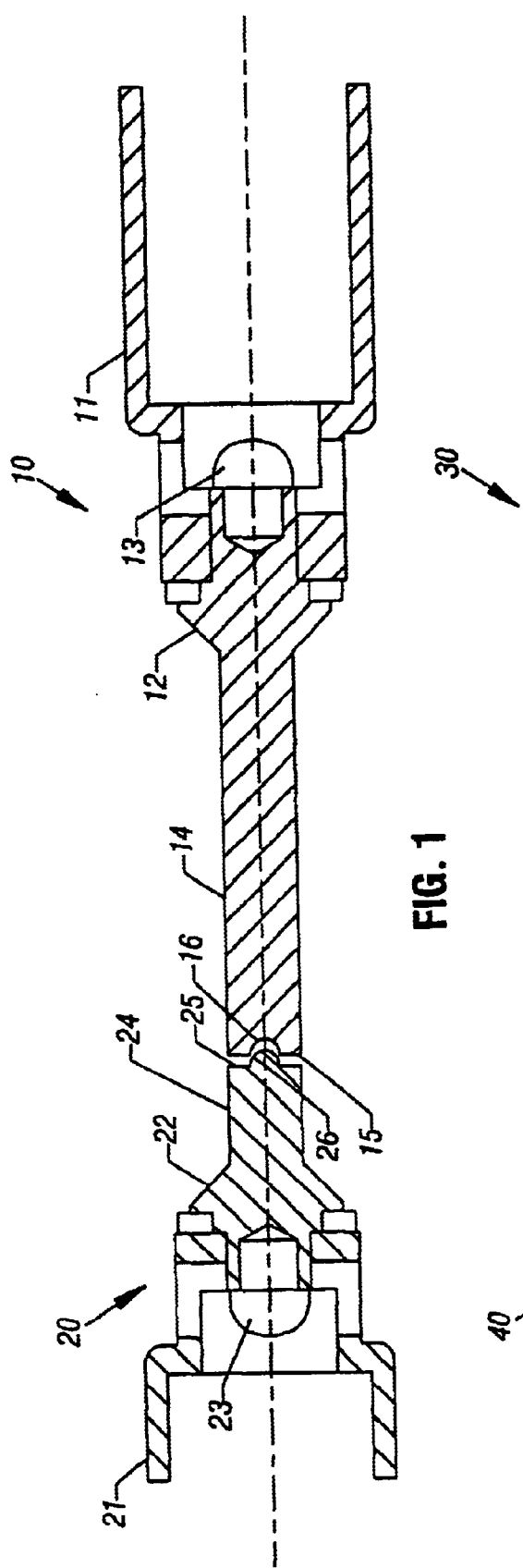
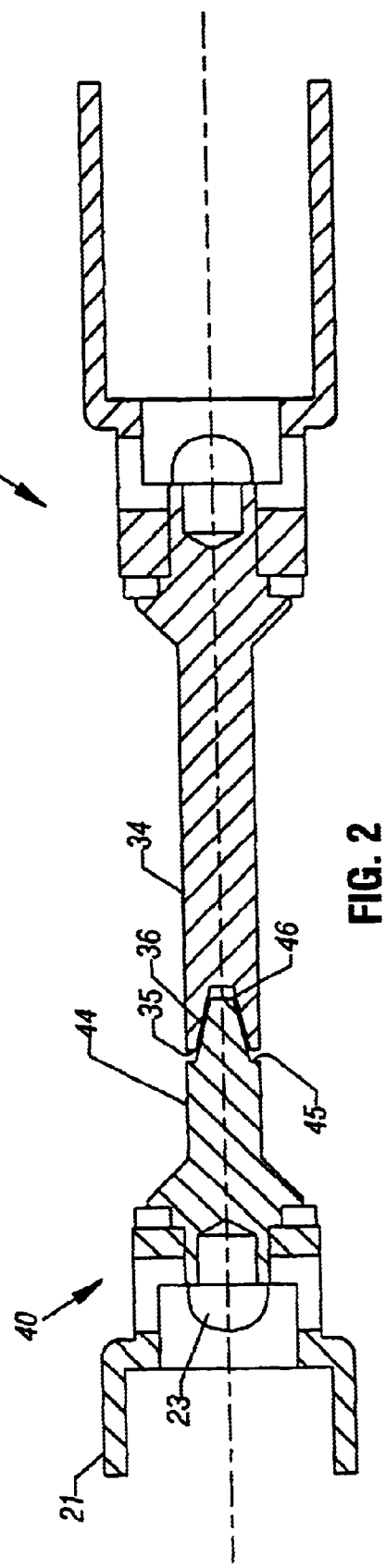

UNDERSEA HYDRAULIC COUPLING WITH INTERLOCKING POPPET VALVE ACTUATORS

BACKGROUND OF THE INVENTION

1. Field of the Invention

This invention relates, in general, to hydraulic couplings, and specifically to hydraulic couplings used in undersea drilling and production applications. More particularly, the invention involves poppet valves for subsea hydraulic couplings that open to allow flow of hydraulic fluid when the coupling members are connected together.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore, or receiving chamber, at one end and a relatively small diameter longitudinal bore at the other. The small bore facilitates connections to hydraulic lines, while the larger bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

The male and female members of a hydraulic coupling each typically include a poppet valve slidably received within the bore of each member. Each poppet valve typically includes a conical valve face which seats, in the closed position, against a valve seat in the bore. The poppet valve opens to allow fluid flow, and closes the poppet valve face against the corresponding valve seat within the bore to arrest the flow. Generally the poppet valve is spring-biased to the closed position. The valve also includes a valve actuator which may be a nose or stem extending from the apex of the valve face along the longitudinal axis of the poppet valve. Contact between the valve actuators of the male and female member poppet valves forces each valve face away from the valve seat and into the open position for fluid flow between the members. Some undersea coupling members do not have valve actuators, but instead utilize valves that open in response to fluid pressure from the opposing coupling member.

In undersea applications, the male members and female members typically are attached to opposing manifold plates. Typically, between 10 and 30 coupling members may be attached to each manifold plate. It can be desirable to increase the number of coupling members attached to each manifold plate. The size of the manifold plate may be increased to accommodate additional coupling members. However, increasing the dimensions of a manifold plate to accommodate additional coupling members increases its weight and makes it more difficult for hoists, divers or remote operating vehicles to handle the manifold plates and engage the coupling members together, especially at subsea depths of several thousand feet or more. Alternatively, instead of increasing the manifold plate's dimensions, each coupling member may be reduced in size (i.e., diameter). Reducing the diameter of coupling members, however, may also result in narrower flow passages and decreased wall thickness. If possible, it is desirable to reduce the diameter of coupling members without significantly or materially narrowing the flow passages or decreasing the wall thickness. Otherwise, couplings with narrower flow passages and decreased wall thickness may sacrifice performance and reliability, have lower flow rates, and increased risk of leaking hydraulic fluid into sensitive subsea environments.

Several patents of National Coupling Co., Inc. of Stafford, Texas disclose undersea hydraulic couplings having probe sections with reduced diameters, without sacrificing performance and reliability, and without increasing leakage risks. For example, U.S. Pat. No. 6,206,040 discloses an undersea hydraulic coupling having a stepped internal bore and a poppet valve positioned in the body section, rather than the probe section, of the male member. U.S. Pat. No. 6,085,785 discloses an undersea hydraulic coupling member with an extended probe section, and a poppet valve having an actuator that extends through the extended probe section. U.S. Pat. No. 6,283,444 discloses an undersea hydraulic coupling member with a poppet valve in the body section, and a valve actuator extending through the probe section and out from the leading face of the male coupling member. Similarly, U.S. Pat. No. 6,227,245 discloses an undersea hydraulic coupling member with a poppet valve in the body section, and a valve actuator extending through the probe section and out from the leading face of the male coupling member.

Most subsea coupling members have valve actuators that are less than one half the length of the poppet valve. The coupling members disclosed in the National Coupling patents identified above, however, have valve actuators that are greater than one half the length of the poppet valve, and may be one inch or more in length. These valve actuators extend at least partially through the internal bore in the probe section, and may or may not extend out from the leading face of the male coupling member in the normally closed position.

Hydraulic fluid in subsea hydraulic systems exerts high forces against the poppet valves in the coupling members, especially at higher flow rates and pressures. Valve actuators are especially vulnerable to the high hydraulic fluid forces. Valve actuators are subjected to the flow and turbulence of hydraulic fluid through the internal bore of each coupling member and at the junction where the coupling members are engaged together. Hydraulic fluid pressure and turbulence exerts lateral pressure against the valve actuators and may even bend, deflect, or laterally displace the valve actuators. Bent or deflected valve actuators may not properly contact each other to reliably open the poppet valves when undersea hydraulic coupling members are engaged together. Damaged valve actuators also can increase the risk of leakage or detrimentally affect the performance of the hydraulic system of which the coupling is a part.

SUMMARY OF THE INVENTION

The present invention resides in an undersea hydraulic coupling of the foregoing type having interlocking valve actuators. Valve actuators extending from each poppet valve come into contact to open the valves. The leading face of one valve actuator has a projection, and the leading face of the second valve actuator has a corresponding, mating recess. When the projection enters and engages the recess, the leading faces of the valve actuators interlock. The interlocked valve actuators better resist bending, deflection, or lateral displacement due to hydraulic fluid pressure and turbulence, thereby limiting or preventing damage to the actuators and hydraulic system.

BRIEF DESCRIPTION OF THE DRAWINGS

FIG. 1 is a partial section view of the poppet valves of the male and female coupling members according to a first preferred embodiment of the present invention.

FIG. 2 is an partial section view of the poppet valves of the male and female coupling members according to a second preferred embodiment of the present invention.

DESCRIPTION OF PREFERRED EMBODIMENTS

Figure 3:
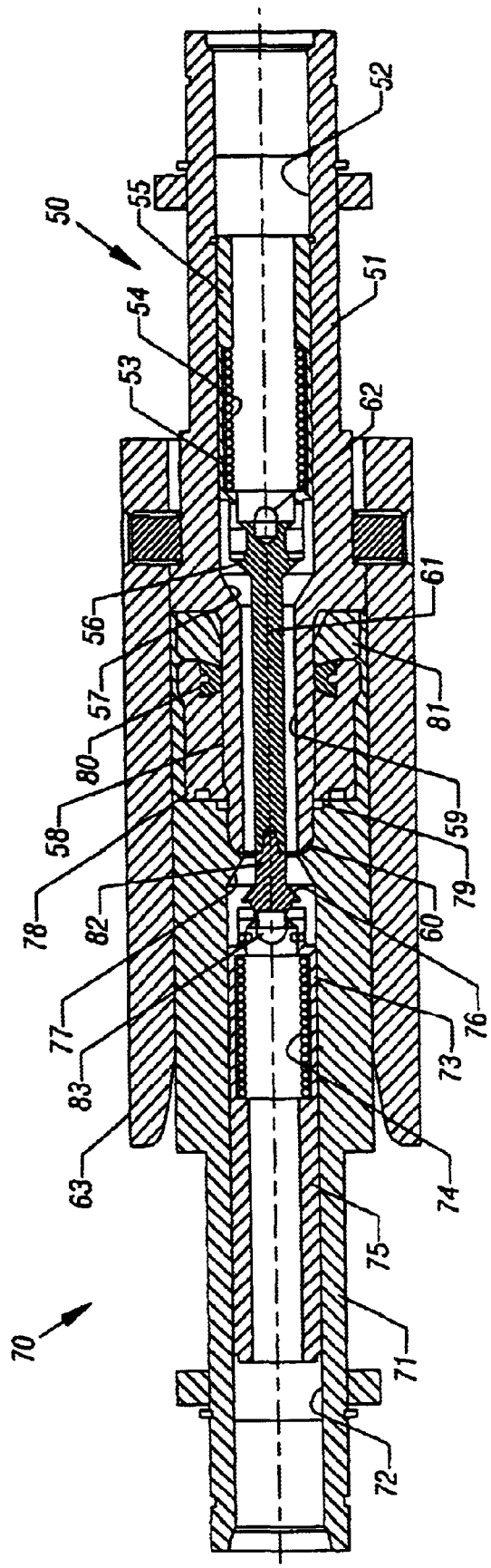
FIG. 3 is a section view of an undersea hydraulic coupling having the poppet valves of the present invention according to a preferred embodiments.

As shown in FIG. 1, first poppet valve 10 has cylindrical valve body 11, conical valve face 12, and a plurality of apertures 13 for hydraulic fluid to flow between the valve body and valve face when the first poppet valve is open. Second poppet valve 20 also has cylindrical valve body 21, conical valve face 22, and a plurality of apertures 23 for hydraulic fluid to flow between the cylindrical valve body and valve face when the second poppet valve is open.

First actuator 14 extends from the apex of valve face 12, and second actuator 24 extends from the apex of valve face 22. In the embodiments of FIGS. 1, 2 and 3, only the first actuator is more than one half the length of the poppet valve from which the actuator extends.

The present invention contemplates that the length of each valve actuator may be less, or more, than one half the length of the poppet valve. The advantages of the present invention exist, and the invention is suitable, for use with hydraulic couplings having valve actuators of any length. The invention is particularly useful, however, for undersea hydraulic couplings having valve actuators that extend at least partially through the bore in the probe section, including undersea hydraulic couplings wherein at least one of the actuators is longer than one half the length of the poppet valve. The valve actuator in the male member may extend out from the leading face of the probe section when the poppet valves is closed, and will contact the valve actuator of the female coupling member outside the probe section. Alternatively, the valve actuator in the male member may not extend from the leading face of the probe section, so it will contact the valve actuator of the female member only after the female valve actuator has partially entered the probe section.

Leading face 15 of valve actuator 14 has a generally hemispherical recess 16 therein, and leading face 25 of valve actuator 24 has a generally hemispherical projection 26 extending therefrom. When the valve actuators come into contact and engage to open the poppet valves of the male and female coupling members, projection 26 interlocks with recess 16. The interlocked valve actuators resist bending, deflection, and other lateral displacement from hydraulic fluid forces in the internal bore of the probe section and at the junction between the coupling members.

The poppet valves of the present invention are positioned in the internal bores of male and female undersea hydraulic coupling members. The first poppet valve may be positioned in the internal bore of the male coupling member, and the second poppet valve is positioned in the internal bore of the female coupling member. Alternatively, the first poppet valve may be in the internal bore of the female coupling member, and the second poppet valve in the internal bore of the male coupling member.

FIG. 2 shows first poppet valve 30 and second poppet valve 40 with valve actuators 34 and 44 respectively extending therefrom. Leading face 35 of valve actuator 34 has a frustaconical recess 36 therein, and leading face 45 of valve actuator 44 has a frustoconical projection 46 extending therefrom. When the actuators come into contact to open the poppet valves, projection 46 engages and interlocks with recess 36.

FIG. 3 shows male coupling member 50 engaged to female coupling member 70 in which the valve actuators are interlocked and the poppet valves are opened for hydraulic fluid transmission. The male member has a generally cylindrical body 51 and a probe section 58 with a reduced diameter. In the embodiment of FIG. 3, sleeve 63 also is attached to the male member body. Internal bore 52 extends through the generally cylindrical body of the male coupling member. The poppet valve positioned in the body section of the male member includes cylindrical poppet valve body 53 that slides in the internal bore and is biased by valve spring 54 toward the closed position. In the normally closed position, conical valve face 56 seals against valve seat 57. Spring collar 55 holds the valve spring in the internal bore. The poppet valve in the male coupling member has a plurality of apertures 62 for hydraulic fluid to flow between the cylindrical valve body and conical valve face. The probe section has an internal bore 59 extending therethrough, preferably having an internal diameter less than internal bore 52 in the body section of the male member. While the poppet valve resides in the body section of the male member, valve actuator 61 extends from the conical valve face, through bore 59 in the probe section, and out from leading face 60 of the probe section of the male member. Alternatively, valve actuator may not extend from the leading face of the probe section, as discussed above.

Female member 70 of the undersea hydraulic coupling, in a preferred embodiment shown in FIG. 3, has a generally cylindrical body 71 with internal bore 72 extending therethrough. The female member poppet valve has a cylindrical valve body 73 and a conical valve face 76. Valve spring 74, held to the internal bore by spring collar 75, biases the poppet valve to the normally closed position. In the closed position, conical valve face 76 seals against valve seat 77. In the open position, hydraulic fluid flows through apertures 83 between the cylindrical valve body and the valve face. Valve actuator 82 extends from the apex of the conical valve face. Valve actuator 82 may engage valve actuator 61 adjacent the leading face of the probe section, or valve actuator 82 may partially enter the probe section. Seal retainer 78 is a generally cylindrical body that engages or slides into the female member to retain radial seal 79 in the female member. Additionally, seal 80 is held in the female coupling member between the seal retainer and retainer lock nut 81 that is threaded to the female member.

Although variations in the embodiment of the present invention may not each realize all of the advantages of the invention, certain features may become more important than others in various applications of the device. The invention, according, should be understood to be limited only by the scope of the appended claims.

What is claimed is:

1. A poppet valve for an undersea hydraulic coupling member, comprising:

(a) a hollow cylindrical valve body;

(b) a conical valve face extending from the valve body, at least one aperture between the valve body and conical valve face for flow of hydraulic fluid therethrough;

(c) an actuator extending from the conical valve face, the actuator having a leading face with at least one recess therein.

2. The poppet valve of claim 1 wherein the recess is generally hemispherical.

3. The poppet valve of claim 1 wherein the recess is frustaconical.

4. Poppet valves for male and female undersea hydraulic coupling members, comprising:

(a) a first poppet valve having a hollow body, a conical face, a plurality of apertures between the hollow body and conical face for passage of hydraulic fluid therethrough, a sealing surface adjacent the conical face, and a first actuator extending from the conical face;

(b) a second poppet valve having a hollow body, a conical face, a plurality of apertures between the hollow body and conical face for passage of hydraulic fluid therethrough, a sealing surface adjacent the conical face, and a second actuator extending from the conical face;

(c) the first actuator having a leading face with a projection thereon and the second actuator having a leading face with a recess therein, the projection configured to engage and interlock with the recess.

5. The poppet valves of claim 4 wherein the sealing surface is a conical section attached to the hollow body, each actuator extending from the conical section.

6. The poppet valves of claim 4 wherein the first actuator is shorter than the second actuator.

7. The poppet valves of claim 4 wherein at least one of the actuators has a length greater than one half the length of the poppet valve.

8. The poppet valves of claim 4 wherein the recess and projection are generally hemispherical.

9. The poppet valves of claim 4 wherein the recess and projection are frustaconical.

10. A poppet valve for an undersea hydraulic coupling member, the undersea hydraulic coupling member having a body section and a probe section narrower in diameter than the body section, comprising:

(a) a hollow cylindrical valve body slideable in the body section, the valve body having a first end with a conical valve face with at least one aperture between the valve body and conical valve face for flow of hydraulic fluid therethrough, the conical valve face configured to seal in the closed position, the hollow cylindrical body having a second end engaged to a valve spring urging the poppet valve toward the closed position;

(b) an actuator extending from the conical valve face through the probe section, the actuator having a leading face extending from the probe section, the actuator having at least one projection extending therefrom; and (c) a second poppet valve for a second undersea hydraulic coupling member, the second poppet valve having an actuator with a leading face, and at least one recess in the leading face dimensioned to mate with the projection.

11. A poppet valve for an undersea hydraulic coupling member, the undersea hydraulic coupling member having a body section and a probe section narrower in diameter than the body section, comprising:

(a) a hollow cylindrical valve body slideable in the body section, the valve body having a first end with a conical valve face with at least one aperture between the valve body and conical valve face for flow of hydraulic fluid therethrough, the conical valve face configured to seal in the closed position, the hollow cylindrical body having a second end engaged to a valve spring urging the poppet valve toward the closed position;

(b) an actuator extending from the conical valve face through the probe section, the actuator having a leading face extending from the probe section, the actuator having at least one projection extending therefrom; wherein the projection is generally hemispherical.

12. A poppet valve for an undersea hydraulic coupling member, the undersea hydraulic coupling member having a body section and a probe section narrower in diameter than the body section, comprising:

(a) a hollow cylindrical valve body slideable in the body section, the valve body having a first end with a conical valve face with at least one aperture between the valve body and conical valve face for flow of hydraulic fluid therethrough, the conical valve face configured to seal in the closed position, the hollow cylindrical body having a second end engaged to a valve spring urging the poppet valve toward the closed position;

(b) an actuator extending from the conical valve face through the probe section, the actuator having a leading face extending from the probe section, the actuator having at least one projection extending therefrom; wherein the projection is frustaconical.

* * * * *